(12) United States Patent
Brillon et al.

(10) Patent No.: US 11,845,106 B2
(45) Date of Patent: Dec. 19, 2023

(54) HOUSING HAVING INTUMESCENT COATING AND PROCESS OF PRODUCTION

(71) Applicant: PRATT & WHITNEY CANADA CORP., Longueuil (CA)

(72) Inventors: Louis Brillon, Varennes (CA); Jean-François Belanger, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/363,763

(22) Filed: Jun. 30, 2021

(65) Prior Publication Data
US 2023/0003140 A1 Jan. 5, 2023

(51) Int. Cl.
*B05D 7/00* (2006.01)
*F02C 7/25* (2006.01)

(52) U.S. Cl.
CPC .............. *B05D 7/56* (2013.01); *F02C 7/25* (2013.01); *F05D 2230/90* (2013.01); *F05D 2260/231* (2013.01); *F05D 2300/44* (2013.01)

(58) Field of Classification Search
CPC .. F02C 7/25; F05D 2230/90; F05D 2260/231; F05D 2300/44; B05D 7/56; B05D 1/02; B05D 2202/20; B05D 2504/00; C09D 5/002; C09D 163/00; C09D 5/185
See application file for complete search history.

(56) References Cited

U.S. PATENT DOCUMENTS

| 4,052,526 A | 10/1977 | Pratt et al. |
| 9,371,435 B2 * | 6/2016 | Palmer, Jr. ............... C08K 3/20 |
| 2016/0168393 A1 * | 6/2016 | Kreh ...................... C09D 5/185 |
| | | 427/407.1 |
| 2019/0217411 A1 * | 7/2019 | Verrier ................. B23K 9/1087 |
| 2022/0049358 A1 * | 2/2022 | Heigl ...................... C23C 22/78 |

FOREIGN PATENT DOCUMENTS

| CN | 213117109 | 5/2021 | |
| EP | 3366729 A1 * | 8/2018 | ............ B32B 15/08 |
| EP | 3366729 | 11/2019 | |
| WO | 2020117959 | 6/2020 | |
| WO | 2022117878 | 6/2022 | |

\* cited by examiner

*Primary Examiner* — Brian P Wolcott
(74) *Attorney, Agent, or Firm* — Norton Rose Fulbright Canada LLP

(57) ABSTRACT

The present disclosure relates to a housing for an engine component. The housing comprises a wall made of a light alloy. An epoxy primer coating having at least one layer of a primer containing at least 80 wt. % epoxy covering the wall. An intumescent paint coating having at least one layer of intumescent paint directly covering the epoxy primer. And, an epoxy top coat directly covering the intumescent paint coating, the epoxy top coat having at least one layer of a top coat containing at least 80 wt. % epoxy.

10 Claims, 4 Drawing Sheets

HOUSING HAVING INTUMESCENT COATING AND PROCESS OF PRODUCTION

TECHNICAL FIELD

The application relates generally to intumescent coatings and, more particularly, to intumescent coatings for aircraft engine components.

BACKGROUND OF THE ART

In gas turbine engines used for aircrafts in particular, several regulations exist in terms of reliability and weight is a constant concern since it affects fuel efficiency/range. In particular, regulations can require aircraft components to resist liquid or gaseous fuel fire for a certain period of time. While heavier materials having a higher melting temperature are used in hot sections of the gas turbine engine, such as in the vicinity of the combustor or the turbine section, it can be convenient to use lighter metals (alloys), such as aluminum and magnesium, in cooler regions of the gas turbine engine, in order to harness their lighter weights in areas where melting temperature is less of a concern. Such lighter metals can be used for housings of gas turbine engine components such as pump housings, oil tanks, gearbox housings, etc. While components in the colder sections of the gas turbine engine do not need to withstand the high temperatures of the hot sections for prolonged periods of time, they may still need to have a predefined resistance to high temperatures, for limited periods of time, such as to hold in the event of a fire. Intumescent paints can be used to increase the temperature resistance of such components. Intumescent paints typically include a plurality of layers which swell in the event of high temperatures and which thus afford a certain degree of insulation in their swelled state. While intumescent coatings were satisfactory to a certain degree, there always remains room for improvement.

SUMMARY

In one aspect there is provided a housing for an engine component comprising a wall made of a light alloy, an epoxy primer coating having at least one layer of a primer containing at least 80 wt. % epoxy, the epoxy primer coating covering the wall, an intumescent paint coating having at least one layer of intumescent paint, the intumescent paint coating directly covering the epoxy primer, and an epoxy top coat directly covering the intumescent paint coating, the epoxy top coat having at least one layer of a top coat containing at least 80 wt. % epoxy.

In a further aspect, there is provided a process of coating a wall of a housing for an engine component comprising: providing a wall made of a light alloy; applying a coating of at least one layer of epoxy primer on the wall; applying a coating of at least one layer of intumescent paint on the at least one layer of epoxy primer; and applying a coating of at least one layer of epoxy top coat on the at least one layer of intumescent paint.

In yet a further aspect, there is provided an aircraft, comprising an aircraft engine having a housing comprising a wall made of a light alloy, an epoxy primer coating having at least one layer of a primer containing at least 80 wt. % epoxy, the epoxy primer coating covering the wall, an intumescent paint coating having at least one layer of intumescent paint, the intumescent paint coating directly covering the epoxy primer, and an epoxy top coat directly covering the intumescent paint coating, the epoxy top coat having at least one layer of a top coat containing at least 80 wt. % epoxy.

DESCRIPTION OF THE DRAWINGS

Reference is now made to the accompanying figures in which.

DETAILED DESCRIPTION

Figure 1:
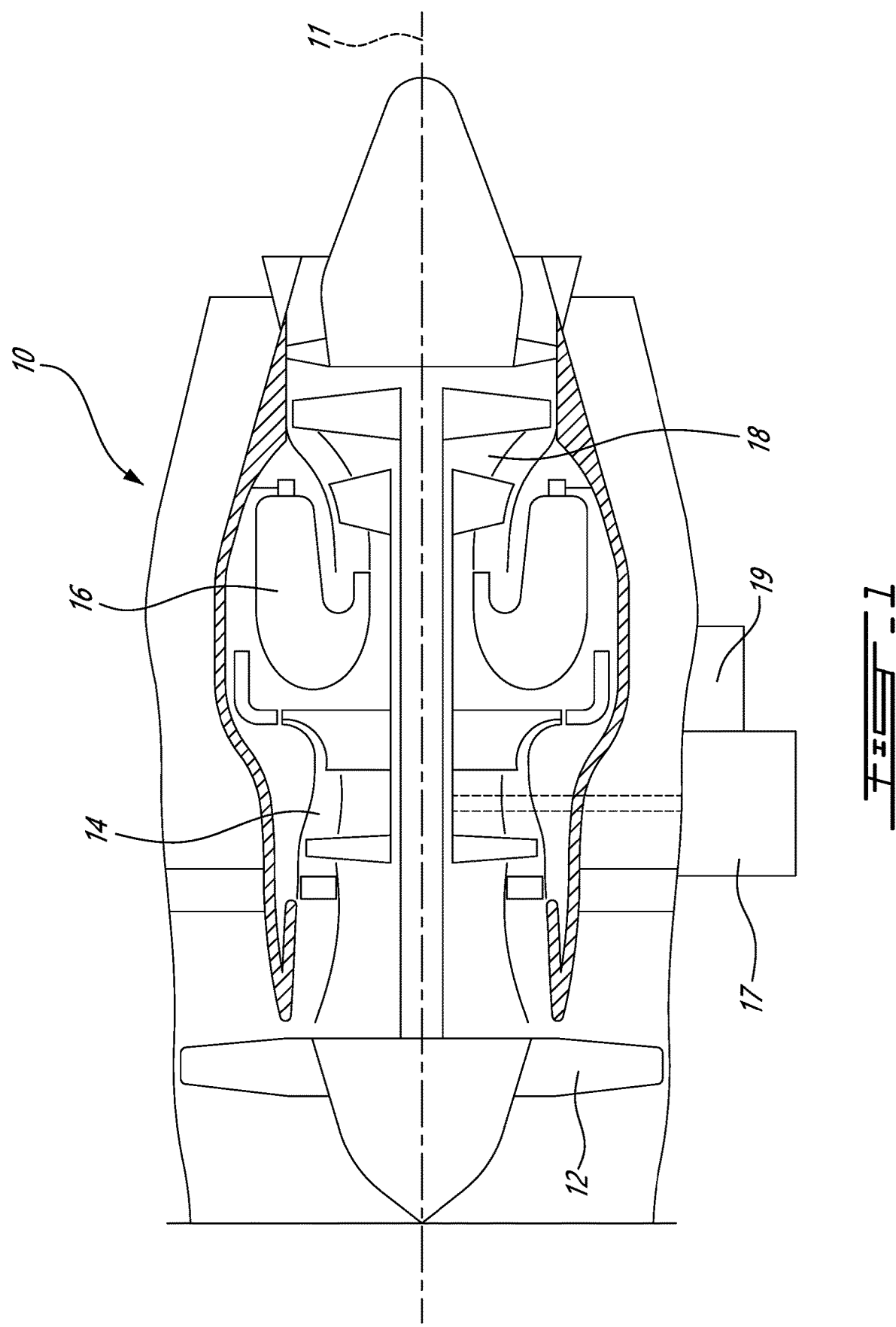
FIG. 1 is a schematic cross-sectional view of a gas turbine engine.

An exemplary gas turbine engine of an aircraft is illustrated in FIG. 1. The engine is preferably of a type that is provided for use in subsonic flight. As can be seen in FIG. 1, the engine generally comprises in serial flow communication a fan 12 through which ambient air is propelled, a compressor section 14 for pressurizing the air, a combustor 16 in which the compressed air is mixed with fuel and ignited for generating an annular stream of hot combustion gases around the engine axis 11, and a turbine section 18 for extracting energy from the combustion gases.

The gas turbine engine can include some components such as the auxiliary gearbox (AGB) 17, an oil tank 19, a pump, etc, which are located in a "colder" region of the engine 10 and thus not directly exposed to the hot combustion gasses. In some embodiments, it can be preferred to make the housings of such components with lighter alloys than the alloys which are typically used in the hot region. Although they are typically exposed to lower temperatures, such components may be required to sustain high temperatures for limited periods of time to preserve functionality in the event of unusual, rare, or unlikely circumstances such as engine fire. In many embodiments, using a housing made of a lighter alloy such as an aluminum or a magnesium alloy, or perhaps in some cases a titanium or a beryllium alloy, can be suitable. In some embodiments, providing such a light alloy housing with an external "intumescent" coating can be deemed appropriate, as the intumescent coating can allow to provide a given housing greater heat resistance at a lower penalty in terms of weight or cost than other options such as changing the thickness and/or the type of alloy used. The term "coating" as used herein encompasses coatings having one or more layers. A coating can have one to three layers for example.

Figure 2:
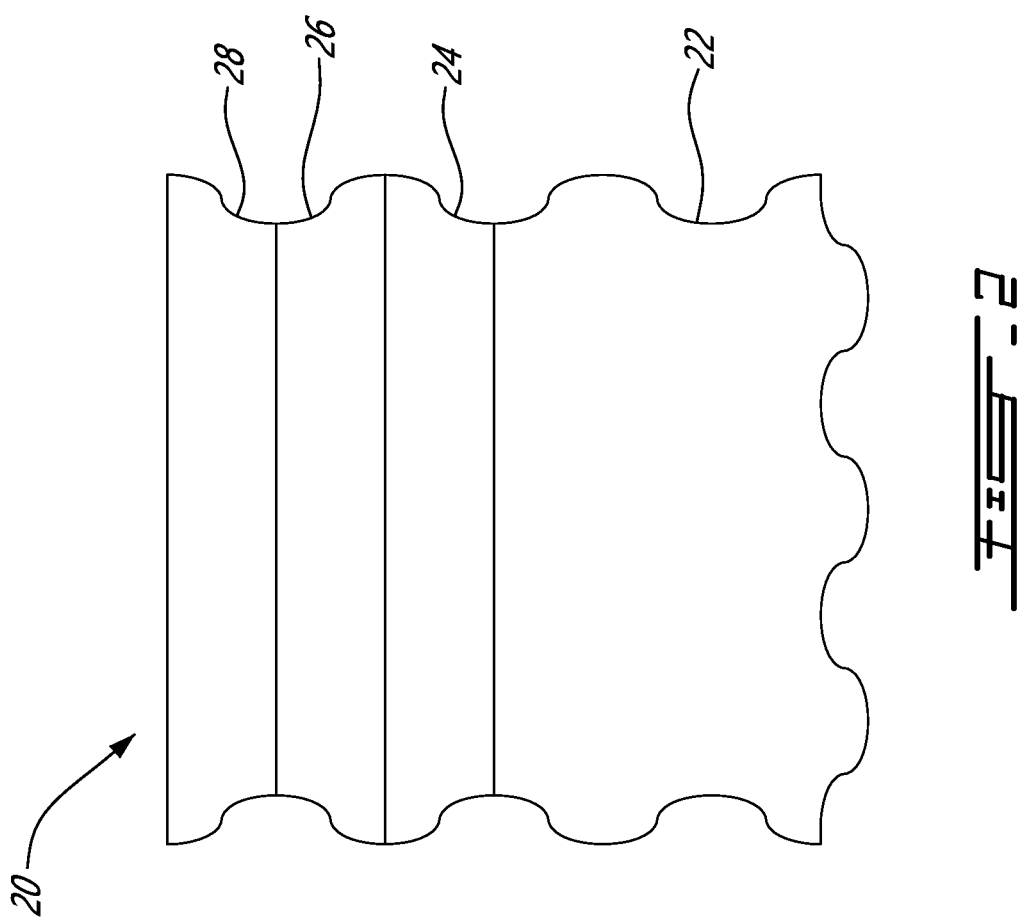
FIG. 2 is a schematic cross-sectional view of a coated wall of a housing, according to an embodiment of the present disclosure.

Accordingly, a gas turbine engine component housings with an intumescent coating can be provided, an example of which is presented in FIG. 2. More specifically, as shown in FIG. 2, a light alloy housing 20 has a wall 22 which is made of the light alloy. The wall 22 is coated with at least one layer of epoxy primer 24 (a bottom layer with respect to the intumescent paint), at least one layer of intumescent paint 26, and an epoxy top coat 28 (a top layer with respect to the intumescent paint). In the illustrated embodiment, the at least one layer of epoxy primer 24 directly coats the at least one layer of intumescent paint 26, which in turn directly costs the at least one layer of epoxy primer 24. In one example, the wall 22 has a thickness of between 0.10 and 0.200 inch.

In the example presented in FIG. 2, the epoxy primer 24 and the epoxy top coat 28 can be used to improve the effectiveness, compatibility and/or lifespan of intumescent paints. The expression "epoxy" used in relation to the expression "primer" or "top coat" herein is used as commonly used in the art, i.e. to specify that the element of the coating in question is a composition which contains epoxy. In one example, the expression "epoxy" used in relation to the expression "primer" or "top coat" means that at least 50% of epoxy containing compounds/polymers are present, preferably at least 80%, and most preferably at least 90%. Such a coating can thus be said to have at least one bottom layer with respect to the intumescent paint layer(s) and at least one top layer with respect to the intumescent paint layer(s). The top layer and the bottom layer of the intumescent coating are not intumescent paint, and the intumescent coating can have one or more intermediate layers of intumescent paint.

The epoxy primer acts as a primer layer by promoting the adhesion to the intumescent paint. The epoxy primer can also have a further role of inhibiting corrosion of the light alloy. Once cured, the epoxy primer can comprise at least 80 wt. %, at least 85 wt. %, at least 90 wt. % or at least 95 wt. % of epoxy resin. The epoxy primer coating contains at least one layer, for example from 1 to 3 layers. In some embodiments, the thickness of the epoxy primer coating is between 0.0005 and 0.0015 inch.

The epoxy top coat is a finish that can provide corrosion resistance and once cured, similarly to the epoxy primer, comprises at least 80 wt. %, at least 85 wt. %, at least 90 wt. % or at least 95 wt. % of epoxy resin. In one exemplary embodiment, the epoxy top coat can be an epoxy enamel based top coat. The term "enamel" is to be understood as is known in the art. Enamel generally refers to a composition of resin, white lead, zinc white and other petroleum products. The epoxy top coat contains at least one layer, for example from 1 to 3 layers. The thickness of the epoxy top coating depends on the number of layers, an exemplary thickness of a single layer of epoxy top coat is 0.001-0.003 inch. Accordingly, in one embodiment, the thickness of the epoxy top coat is between 0.001 and 0.009 inch, preferably between 0.001 and 0.006 inch.

The epoxy primer coating and the epoxy top coat have similar compositions in that they are both epoxy based. These two epoxy coatings are particularly suitable for applications in the low temperature range of an aircraft engine. In some embodiments the expression "low temperature" in the context of an aircraft engine component can be defined in some embodiments as being between 300 F to 400 F. The epoxy primer and the epoxy top coat can be selected in a manner to be able to sustain temperatures of more than 300 F, more than 350 F, or even more than 400 F, for instance, during prolonged usage over the lifecycle of the engine. The epoxy primer coating and the epoxy top coat provide a cost-effective solution for the protection of housings in the low temperature regions of an aircraft engine, when compared for example to more expensive alternatives such as polyamides. The epoxy primer coating and the epoxy top coat can be cured in the absence of polyamides. In one embodiment, the epoxy primer coating and the epoxy top coat can be a bisphenol A derived epoxy that is cured with a primary amine catalyst. The primary amine catalysts can be aliphatic amines, cycloaliphatic amines, and/or aromatic amines. The primary amine catalysts are difunctional (i.e. a diamine) or polyfunctional (i.e. 3 or more primary amine groups). An example of a difunctional primary amine catalyst is isophoronediamine.

In general, during the lifespan of an aircraft engine, a housing in a cold region of the aircraft engine will be exposed to low temperatures of 300-350 F for about 30,000 hours. Although polyamides can provide heat protection above the defined low temperature, the housings are typically not exposed to any higher temperatures. Accordingly, it would be a waste of resources to use polyamide coatings in light of the epoxy coatings of the present disclosure (namely the epoxy primer coating and the epoxy top coat) which achieve similar temperature resistance in the low temperature range for the lifespan of an aircraft engine. Polyamide coatings are more expensive and are more difficult to apply compared to epoxy coatings. Accordingly, in some embodiments, the epoxy primer coating and/or the epoxy top coat have less than 5 wt. % polyamides, less than 3 wt. % polyamides or are substantially free of polyamides.

Typically, it will be worthwhile to prepare the outer surface of the wall 22 before applying the layers of the intumescent coating. Such surface preparation can involve anodizing, plasma treating or applying a conversion coating directly onto the metal outer surface. Some light alloys, such as magnesium in particular, may benefit from or require the application of a sealant. The sealant can be applied between the prepared outer surface and the epoxy primer for instance. Some examples will be presented below.

The term "light alloy" is understood to refer to alloys known to have a lower density than others in the aircraft engine manufacturing industry. In some embodiments, light alloys can be characterized by a density of less than 3.5 g/cm$^3$, preferably less than 3.0 g/cm$^3$. In one embodiment, the light alloy comprises or consists essentially of a magnesium alloy, an aluminum alloy, or combinations thereof. In a further embodiment, the light alloy comprises or consists essentially of a magnesium alloy or an aluminum alloy.

The at least one layer of intumescent paint 26 can be any suitable intumescent paint for aircraft engine applications compatible with the epoxy primer coating. The term "intumescent paint" as used herein refers to a fire-retardant paint that swells when exposed to heat. The activation of intumescent paint to swell generally occurs around the temperature of 120° C. The swelling can result in a soft charring effect on the surface which insulates and reduces the transmission of heat into the coated substrate. The swelling can also result in the release of water vapour which promotes the cooling of the substrate. Depending on the context, thickness, and type of intumescent paint, the intumescent can upgrade the fire resistance of a coated substrate by between a few seconds to around one hour. In some examples, intumescent paints are suitable for a heat stimulus having a temperature of between 200° C. and 600° C. Examples of intumescent paint include but are not limited to the commercial products Indestructible 9189, Lockheed MI-15, and Esterline Fastblock 813. The intumescent paint can be an epoxy based intumescent paint. In some embodiments, the intumescent paint coat has a thickness of between 0.010 and 0.150 inch, or preferably between 0.020 and 0.125 inch. In one example, the thickness of the intumescent paint has a thickness of 0.025-0.030 inch.

Figure 3:
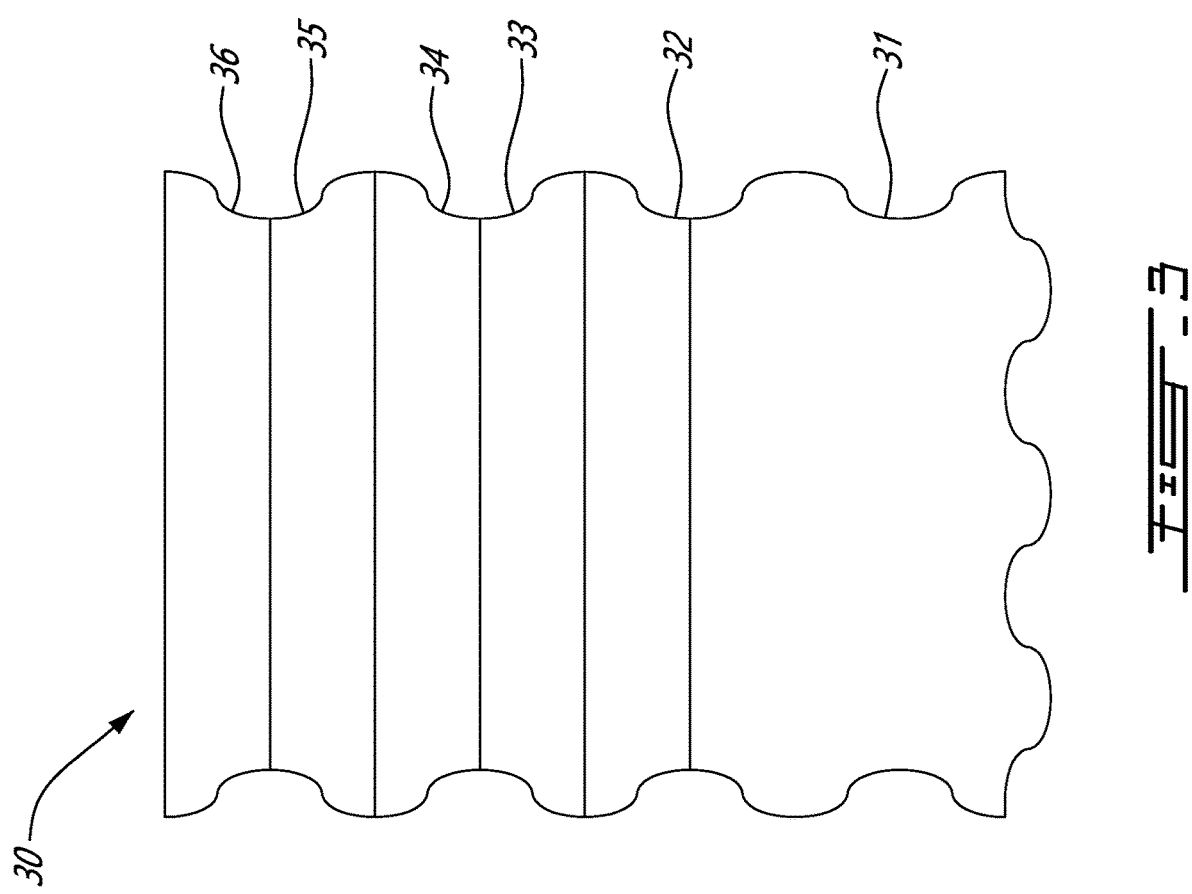
FIG. 3 is a schematic cross-sectional view of a coated wall of a housing, according to an embodiment of the present disclosure.

FIG. 3 illustrates an example of a coated wall 30 of a magnesium alloy housing. The magnesium alloy can be any magnesium alloy suitable for housings of engine components such as AMS4439 and AMS4429. The magnesium wall 31 is optionally coated with an undercoat layer 32 or alternatively with a conversion coating 32. In one example, the undercoat layer 32 can be an oxidation of the light alloy (such as magnesium oxide or aluminum oxide) which can generally be obtained by an anodization or plasma electro oxidation processes such as Tagnite or HAE (Harry A. Evangelides). Examples of a conversion coating 32 include but are not limited to phosphate based conversion coatings, dichromate based conversion coatings, CrMn conversion coatings, FeNi pickle conversion coatings and the like.

The undercoat layer 32 or the conversion coating 32 is optionally coated by at least one layer of epoxy sealant 33. Many known epoxy sealants are suitable for magnesium alloys, and a skilled person can select any appropriate epoxy sealant. In some embodiments, the epoxy sealant can have 1 to 3 layers. In one example, a single layer of epoxy sealant can be applied to have a thickness of 0.00025-0.00045 inch. In another example, two or three layers of epoxy sealant can be applied to provide an epoxy sealant having a total thickness between 0.0005 and 0.0012 inch.

The epoxy sealant 33, is coated by at least one layer of epoxy primer 34, which itself is coated by at least one layer of intumescent paint 35. Finally, as previously described, the intumescent paint 35 coating can be coated with one or more layers of epoxy top coat 36.

Figure 4:
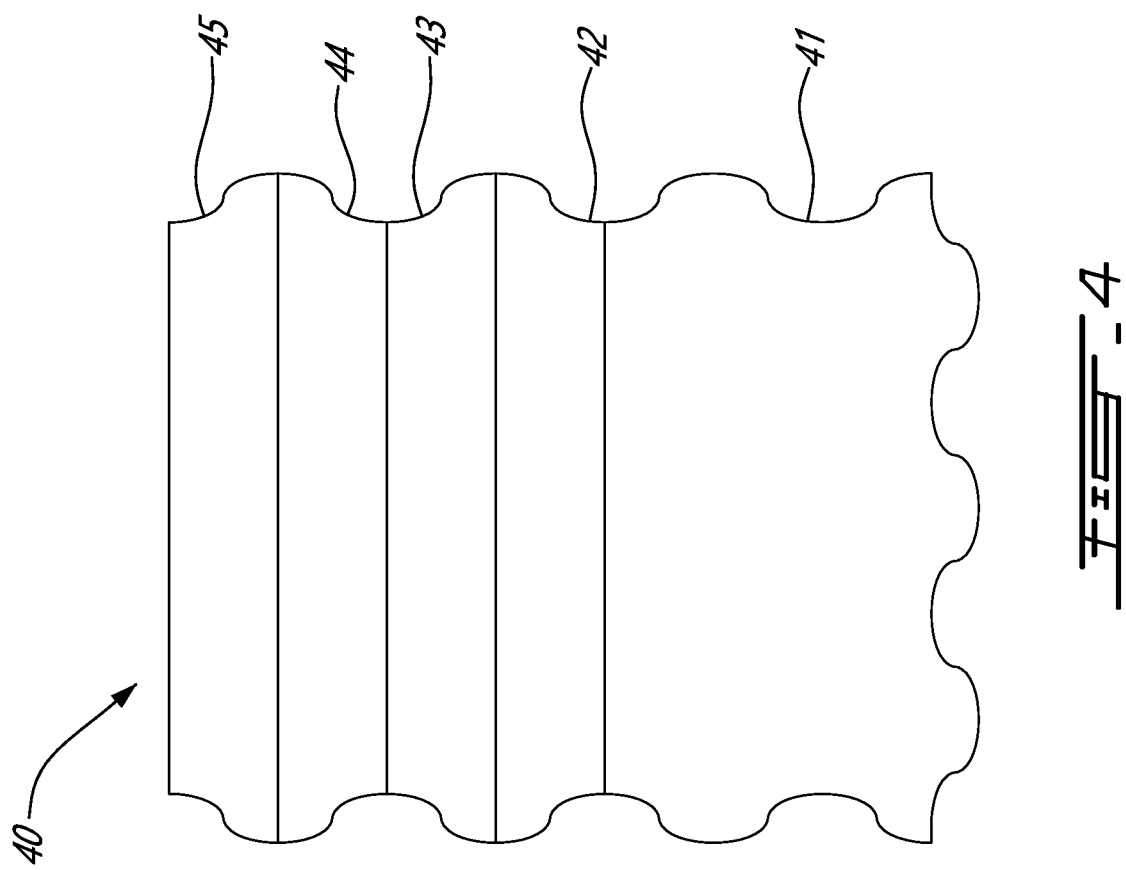
FIG. 4 is a schematic cross-sectional view of a coated wall of a housing, according to an embodiment of the present disclosure.

In another example, FIG. 4 illustrates an example of a coated wall 40 of an aluminum alloy housing. The aluminum alloy can be any aluminum alloy suitable for housings of engine components such as alloys AMS 6061, AMS 7075, AMS 7050, and AlSi7Mg. The aluminum wall 41 is optionally coated with at least one undercoat layer 42 which is a layer of oxidized aluminum. The oxidized aluminum can be obtained by anodization or plasma electro oxidation processes such as Tagnite or HAE (Harry A. Evangelides). The at least one undercoat layer 42 is coated by at least one layer of epoxy primer 43, which itself is coated by at least one layer of intumescent paint 44. Finally, as previously described, the intumescent paint 44 coating is coated by at least one layer of epoxy top coat 45.

Although various types of light alloys may be used in aircraft engine component construction and may benefit from an intumescent coating on an exposed surface thereof, in some embodiments, aluminium can be favoured over magnesium, for instance, given its intrinsically greater fire resistance.

The coating according to the present disclosure may be applied by the following methods providing a wall made of a light alloy; applying a coating of at least one layer of epoxy primer on the wall; applying a coating of at least one layer of intumescent paint on the at least one layer of epoxy primer; and applying a coating of at least one layer of epoxy top coat on the at least one layer of intumescent paint. In some embodiments, prior to providing the wall, the wall can be washed to remove dirt, grease, oil, and other contaminants to obtain a washed wall. The washed wall may be coated after washing or may be packaged and stored for future use.

The terms "applying" or "application" refer to any suitable method of covering a substrate with a layer of a coating. The applying step can be performed by spraying, dipping, brushing, and the like. However, in the context of a housing of a component of an aircraft engine, spraying is the optimal application technique in view of the size, shape, and complexity of aircraft parts. In one example, spraying can be performed with a spray gun. All the "applying" steps can be performed in suitable temperature and humidity conditions, for example room temperature with a humidity of 40-60%. Furthermore, a freshly applied coating is allowed to sufficiently dry such that the integrity of the freshly applied coating will be conserved, before any further coating(s) is/are applied. Drying can be performed at room temperature or with heating to accelerate the drying.

In some embodiments, the epoxy primer coating is obtained by first preparing a primer precursor mixture comprising an epoxy resin and a primary amine catalyst, spraying the precursor mixture on the wall and curing the precursor mixture. Similarly, in some embodiments, the epoxy top coat is obtained by preparing a top coat precursor mixture comprising an epoxy resin and a primary amine catalyst, spraying the top coat precursor mixture on the wall and curing the precursor mixture. More specifically, in one example, the epoxy primer coating is obtained by mixing a resin composition comprising 10-25 wt. % of Bisphenol A resin with a catalyst composition comprising 40-60 wt. % of isophoronediamine in a weight ratio of around 9:1 (±10%), to obtain a primer precursor mixture. Then, the primer precursor mixture is loaded in a spray gun, and the primer precursor mixture is then sprayed on the wall, and cured at a temperature of 150-250 F for 1.5-4 h. In a further example, the epoxy top coat is obtained by mixing a resin composition comprising 40-60 wt. % of bisphenol A resin and a catalyst composition comprising 30-40 wt. % isophoronediamine in a weight ratio of around 3:1 (±10%), to obtain a top coat precursor mixture. Then, the top coat precursor mixture is loaded in a spray gun, and the top coat precursor mixture is then sprayed on the wall, and allowed to fully cure which may take days.

Various types of intumescent paints can be used depending on the application, and the number of layers and overall thickness of the intumescent coating can vary from one embodiment to another and depending on the intumescent paint manufacturer specifications. In one example, a 0.062 or 0.125 in 6061-T6 aluminum wall can be coated with a 0.02 in thick indestructible 9189 coating, a 0.062 or 0.125 in thick Lockheed MI-15 coating, or a 0.125 or 0.25 Esterline Fastblock 813 coating for instance.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A housing for an engine component comprising a wall made of a magnesium alloy, an epoxy primer coating having at least one layer of a primer containing at least 80 wt. % epoxy, the epoxy primer coating covering the wall, an intumescent paint coating having at least one layer of intumescent paint, the intumescent paint coating directly covering the epoxy primer, and an epoxy top coat directly covering the intumescent paint coating, the epoxy top coat having at least one layer of a top coat containing at least 80 wt. % epoxy, wherein the epoxy primer coating and the epoxy top coat comprise less than 5 wt. % of polyamides.

2. The housing of claim 1, wherein the magnesium alloy is selected from a magnesium alloy AMS 4439, or a magnesium alloy AMS 4429.

3. The housing of claim 1, wherein the intumescent paint coating has a thickness of between 0.010 and 0.150 inch.

4. The housing of claim 1, wherein the wall has a thickness of between 0.10 and 0.200 inch.

5. The housing of claim 1, wherein the epoxy top coat has a thickness of between 0.001 and 0.009 inch.

6. The housing of claim 1, wherein the epoxy primer coating has a thickness of between 0.0005 and 0.0015 inch.

7. The housing of claim 1, further comprising at least one layer of epoxy sealant below the at least one layer of epoxy primer.

8. The housing of claim 1, further comprising a first layer of conversion coating or an undercoat layer below the at least one layer of epoxy primer.

9. The housing of claim 1, further comprising at least one layer of epoxy sealant below the at least one layer of epoxy primer and a first layer of conversion coating or an anodized layer below the at least one layer of epoxy sealant.

10. A housing for an engine component comprising a wall made of a light alloy, an epoxy primer coating having at least one layer of a primer containing at least 80 wt. % epoxy, the epoxy primer coating covering the wall, an intumescent paint coating having at least one layer of intumescent paint, the intumescent paint coating directly covering the epoxy primer, and an epoxy top coat directly covering the intumescent paint coating, the epoxy top coat having at least one layer of a top coat containing at least 80 wt. % epoxy, wherein the epoxy primer coating and the epoxy top coat comprise less than 5 wt. % of polyamides.

* * * * *